(12) United States Patent
Chen et al.

(10) Patent No.: US 11,422,591 B2
(45) Date of Patent: Aug. 23, 2022

(54) HINGE ASSEMBLY WITH VERTICAL TORQUE ENGINE

(71) Applicant: Hewlett-Packard Development Company, L.P., Spring, TX (US)

(72) Inventors: Wei-Chung Chen, Taipei (TW); Chung-Hua Ku, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 367 days.

(21) Appl. No.: 16/641,464

(22) PCT Filed: Aug. 31, 2017

(86) PCT No.: PCT/US2017/049510
§ 371 (c)(1),
(2) Date: Feb. 24, 2020

(87) PCT Pub. No.: WO2019/045709
PCT Pub. Date: Mar. 7, 2019

(65) Prior Publication Data
US 2020/0183463 A1 Jun. 11, 2020

(51) Int. Cl.
*G06F 1/16* (2006.01)
*E05D 3/12* (2006.01)
*E05D 5/04* (2006.01)
*E05D 11/08* (2006.01)
*E05D 11/10* (2006.01)
(Continued)

(52) U.S. Cl.
CPC .......... *G06F 1/1681* (2013.01); *E05D 3/122* (2013.01); *E05D 5/04* (2013.01); *E05D 11/081* (2013.01); *E05D 11/1064* (2013.01); *F16C 11/04* (2013.01); *F16C 11/103* (2013.01); *E05Y 2900/606* (2013.01)

(58) Field of Classification Search
CPC ....... E05D 3/122; E05D 11/08; E05D 11/081; E05D 11/082; E05D 11/1064
See application file for complete search history.

(56) References Cited

U.S. PATENT DOCUMENTS

| 4,347,645 A | * | 9/1982 | Iseki | ......................... E05D 7/04 |
| | | | | 16/249 |
| 5,406,678 A | * | 4/1995 | Kaden | ................... G06F 1/1681 |
| | | | | 16/342 |
| 5,564,163 A | | 10/1996 | Lowry et al. | |

(Continued)

*Primary Examiner* — Jeffrey O'Brien
(74) *Attorney, Agent, or Firm* — Global IP Services PLLC

(57) ABSTRACT

In one example, a hinge assembly is disclosed, which may include a band torque engine having at least one bearing portion and a vertical torque engine coupled to the band torque engine. The vertical torque engine may have an opening. The hinge assembly may include a first shaft received through the at least one bearing portion and the opening. The first shaft may be rotatable along an axis with respect to the band torque engine and the vertical torque engine. The hinge assembly may include a display bracket including an adaptor portion to hold the first shaft such that the first shaft rotates along with the display bracket. The band torque engine may provide a frictional torque and the vertical torque engine may compressively engage with the first shaft to provide a vertical frictional torque during rotation of the display bracket.

11 Claims, 3 Drawing Sheets

(51) Int. Cl.
*F16C 11/04* (2006.01)
*F16C 11/10* (2006.01)

(56) References Cited

U.S. PATENT DOCUMENTS

| | | | |
|---|---|---|---|
| 6,101,676 A | 8/2000 | Wahl et al. | |
| 6,347,433 B1 | 2/2002 | Novin et al. | |
| 6,470,532 B2* | 10/2002 | Rude | G06F 1/1681 |
| | | | 16/338 |
| 6,584,646 B2* | 7/2003 | Fujita | G06F 1/1616 |
| | | | 16/342 |
| 6,708,370 B2* | 3/2004 | Shih | G06F 1/1679 |
| | | | 16/335 |
| 6,757,940 B2* | 7/2004 | Lu | G06F 1/1616 |
| | | | 16/303 |
| 6,983,514 B2* | 1/2006 | Lu | G06F 1/1681 |
| | | | 16/303 |
| 7,275,286 B2* | 10/2007 | Lu | G06F 1/1616 |
| | | | 16/335 |
| 7,377,012 B2* | 5/2008 | Lu | G06F 1/1616 |
| | | | 16/376 |
| 7,936,559 B2* | 5/2011 | Chen | G06F 1/1681 |
| | | | 361/679.29 |
| 8,060,985 B2* | 11/2011 | Lin | G06F 1/1616 |
| | | | 16/374 |
| 8,402,609 B2* | 3/2013 | Chien | E05D 11/1014 |
| | | | 16/374 |
| 9,310,848 B2* | 4/2016 | Fujino | G06F 1/1681 |
| 9,411,365 B1 | 8/2016 | Tanner et al. | |
| 9,523,384 B2* | 12/2016 | Hsu | G06F 1/1681 |
| 9,540,855 B2* | 1/2017 | Kato | E05D 3/122 |
| 9,644,412 B2* | 5/2017 | Novin | E05D 3/02 |
| 9,714,533 B2* | 7/2017 | Kuramochi | G06F 1/1681 |
| 10,000,955 B2* | 6/2018 | Shang | F16C 11/045 |
| 10,019,039 B1* | 7/2018 | Hsu | E05D 11/082 |
| 10,401,914 B2* | 9/2019 | Shang | E05D 3/122 |
| 10,563,438 B1* | 2/2020 | Chen | E05D 11/082 |
| 2006/0272128 A1* | 12/2006 | Rude | E05D 11/084 |
| | | | 16/342 |
| 2007/0050943 A1* | 3/2007 | Chiu | G06F 1/1681 |
| | | | 16/342 |
| 2007/0079477 A1* | 4/2007 | Huang | H05K 5/0226 |
| | | | 16/342 |
| 2007/0090249 A1* | 4/2007 | Lu | G06F 1/1616 |
| | | | 16/337 |
| 2008/0141494 A1 | 6/2008 | Hsu et al. | |
| 2010/0281653 A1* | 11/2010 | Lin | G06F 1/1681 |
| | | | 16/285 |
| 2011/0072620 A1* | 3/2011 | Wang | H04M 1/0216 |
| | | | 16/342 |
| 2012/0023704 A1* | 2/2012 | Case | E05D 11/084 |
| | | | 16/337 |
| 2013/0111705 A1* | 5/2013 | Mai | E05D 11/1042 |
| | | | 16/342 |
| 2016/0369543 A1 | 12/2016 | Park | |
| 2017/0218672 A1 | 8/2017 | Novin | |
| 2020/0109583 A1* | 4/2020 | Chen | E05D 11/1042 |

* cited by examiner

HINGE ASSEMBLY WITH VERTICAL TORQUE ENGINE

BACKGROUND

Electronic devices such as laptop computers, tablet computers, convertible devices, mobile phones, and the like may include a first housing, a second housing, and a hinge assembly mounted between the first housing and the second housing. For example, the first housing may house a keyboard, a motherboard, and/or other components. The second housing may house a display. The hinge assembly may be pivotally connected to the first housing and the second housing along an axis.

BRIEF DESCRIPTION OF THE DRAWINGS

Examples are described in the following detailed description and in reference to the drawings, in which.

DETAILED DESCRIPTION

Figure 1A:
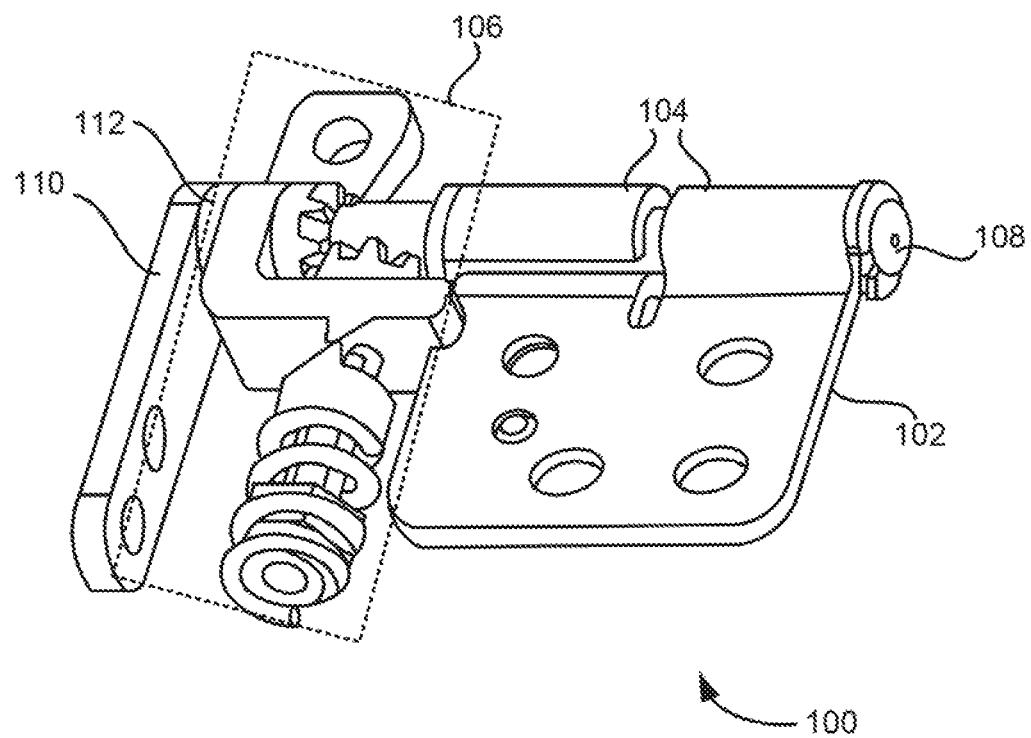
FIG. 1A is a perspective view of an example hinge assembly.

Hinged electronic devices, such as laptop computers, tablet computers, personal digital assistants (PDAs), and flip mobile phones, may include a base housing and a display housing connected by a hinge. The display housing may include a display (e.g., a touchscreen) and the base housing may include one or more input devices, such as a keyboard, a pointing stick, mouse buttons, a touchpad, and/or a trackpad. The display housing may be attached to the base housing such that the display housing can be moved and/or rotated with respect to the base housing along an axis to hold the display at multiple positions. To achieve such rotation, the display housing can be attached to the base housing using one or more hinges that will allow the display housing to be rotated about the base housing.

A user interacting with an electronic device may like to move the display housing with respect to the base housing using a smooth uniform motion as opposed to multiple disjointed "jerk-like" movements. In addition, the user may like to have the selected position of the display housing with respect to the base housing to be in a stable and a stationary position once movement of the display housing is stopped. During rotation of the display housing, the display housing may be held in an angular position by the torque generated between friction elements in the hinge and the shaft. However, for electronic devices which incorporate either pen-based functions or touchscreen technology, the hinges may not provide sufficient torque to hold the display in a selected location, considering the weight of the display as well as the torque generated from a user pressing a pen or finger on the display.

Examples described herein may provide a hinge assembly for an electronic device. The hinge assembly may include a first shaft and a band torque engine having at least one bearing portion rotatably coupled to the first shaft and a flange portion fixedly engaged with a first housing. The hinge assembly may include a vertical torque engine fixedly coupled to the band torque engine. The vertical torque engine may have an opening to rotatably engage with the first shaft. The hinge assembly may include a display bracket including an adaptor portion fixedly coupled to the first shaft and a flange portion fixedly engaged with the second housing.

In one example, the vertical torque engine may include a second shaft disposed perpendicular to the first shaft and a spring mounted on the second shaft such that the spring and the second shaft are compressively engaged with the first shaft to provide a vertical frictional torque. During rotation of the second housing relative to the first housing, the band torque engine may provide a frictional torque and the vertical torque engine may compressively engage with the first shaft to provide a vertical frictional torque.

Examples described herein may provide the vertical torque engine in combination with the band torque engine to provide multi-friction torque with a reduced length of the hinge assembly. Examples described herein may provide a narrow border hinge assembly as the display bracket is connected to the second housing (e.g., display housing) perpendicular to the plane of the second housing. Also, examples described herein may provide the hinge assembly with substantially reduced diameter.

FIG. 1A is a perspective view of an example hinge assembly 100. Example hinge assembly 100 may be a single-axis hinge assembly. Hinge assembly 100 may pivotally connect a display housing to a base housing along an axis. Hinge assembly 100 may include a band torque engine 102 having at least one bearing portion 104. For example, band torque engine 102 may include a geometry similar to a question mark. Hinge assembly 100 may include a vertical torque engine 106 coupled to band torque engine 102. In one example, vertical torque engine 106 may have an opening.

Hinge assembly 100 may include a first shaft 108 received through at least one bearing portion 104 and the opening defined in vertical torque engine 106. In one example, first shaft 108 may be rotatable along the axis relative to band torque engine 102 and vertical torque engine 106. Further, hinge assembly 100 may include a display bracket 110 including an adaptor portion 112 to hold first shaft 108 such that first shaft 108 rotates along with display bracket 110. In one example, band torque engine 102 may provide a frictional torque while vertical torque engine 106 may be compressively engaged with first shaft 108 to provide a vertical frictional torque during rotation of display bracket 110. Components of vertical torque engine 106 may be explained in FIG. 1B.

Figure 1B:
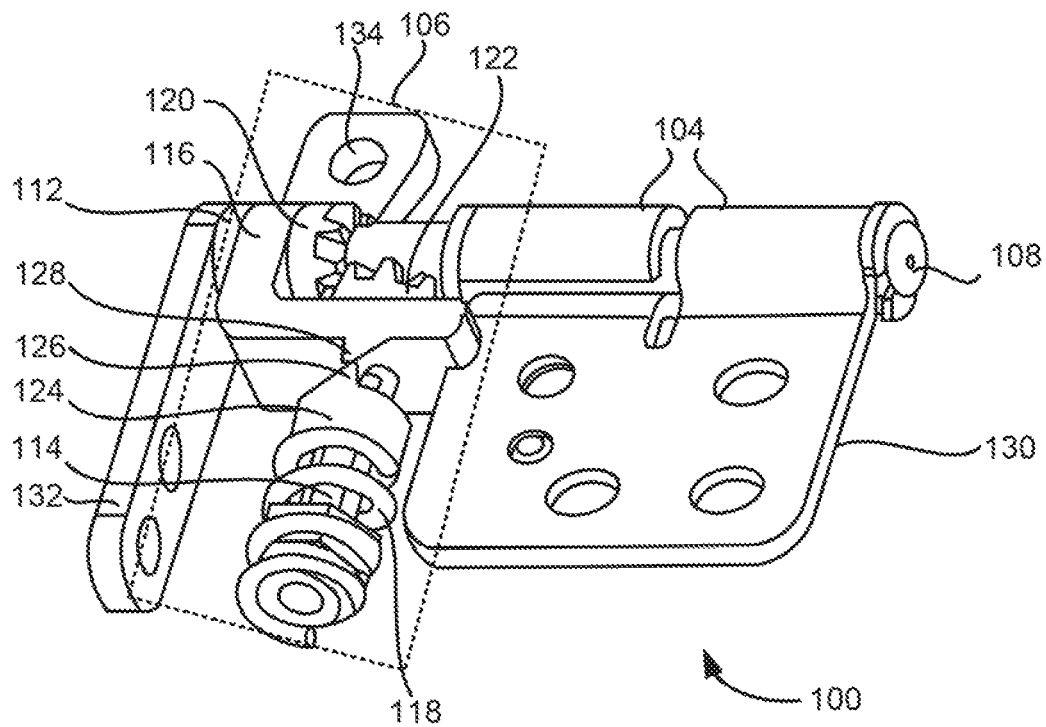
FIG. 1B is a perspective view of the example hinge assembly of FIG. 1A, depicting additional features.

FIG. 1B is a perspective view of example hinge assembly 100 of FIG. 1A, depicting additional features. As shown in FIG. 1B, band torque engine 102 may include a base flange portion 130 to fixedly engage band torque engine 102 to a base housing. Further as shown in FIG. 1B, display bracket 110 may include a display flange portion 132 to fixedly engage display bracket 110 to the display housing.

As shown in FIG. 1B, vertical torque engine 106 may include a coupling feature 134 to fixedly engage vertical torque engine 106 to the base housing. In one example, vertical torque engine 106 may include a second shaft 114 and a vertical shaft holder 116 to hold second shaft 114 perpendicular to first shaft 108. In one example, vertical shaft holder 116 may be coupled to band torque engine 102 and may include the opening to receive first shaft 108. Further, vertical torque engine 106 may include a spring 118 mounted on second shaft 114. In one example, spring 118 may be in a compressed state when display bracket 110 is in a closed position relative to band torque engine 102.

Further, vertical torque engine 106 may include a friction mechanism to compressively engage vertical torque engine 106 relative to first shaft 108 using spring 118 and second shaft 114. Example friction mechanism may include a first gear wheel 120 and a second gear wheel 122 fixedly coupled to first shaft 108 and second shaft 114, respectively. Further, example friction mechanism may include a cam member 124 fixedly coupled to second shaft 114 with one side engaging with spring 118 and another side having a protruding feature 126 engaging with a protruding feature 128 of vertical shaft holder 116. First gear wheel 120 and second gear wheel 122 may rotate second shaft 114 during rotation of first shaft 108 such that spring 118 may provide vertical frictional torque via second shaft 114 and corresponding protruding features 126 and 128 of cam member 124 and vertical shaft holder 116. Cam member 124 and vertical shaft holder 116 may stay compressed by the force of spring 118 with respect to each other. In this way, hinge assembly 100 can be used to provide stability for the display housing at selected positions.

Figure 2A:
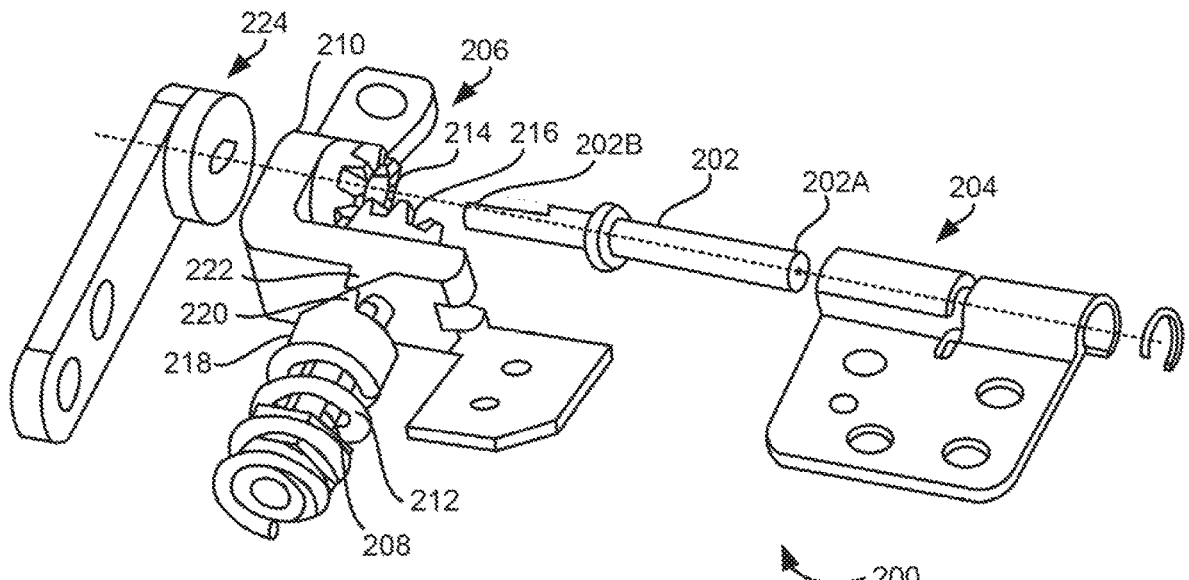
FIG. 2A is an exploded view of the example hinge assembly.

FIG. 2A is an exploded view of example hinge assembly 200. Example hinge assembly 200 may include a first shaft 202, a band torque engine 204 rotatably coupled to a first end 202A of first shaft 202, a vertical torque engine 206, and a display bracket 224 to fixedly hold a second end 202B of first shaft 202. In one example, vertical torque engine 206 may include a second shaft 208 and a vertical shaft holder 210 to hold second shaft 208 perpendicular to first shaft 202. In one example, first shaft 202 may be rotatably coupled to vertical shaft holder 210.

Further, vertical torque engine 206 may include a spring 212 mounted on second shaft 208. Vertical torque engine 206 may include a first gear wheel 214 and a second gear wheel 216 fixedly mounted to first shaft 202 and second shaft 208, respectively, to rotate second shaft 208 during rotation of first shaft 202. Vertical torque engine 206 may include a cam member 218 to fixedly mounted on second shaft 208 between spring 212 and vertical shaft holder 210. Cam member 218 may include an opening/bore 252 through which second shaft 208 is inserted. In one example, cam member 218 may have a protruding feature 220 engaging with a protruding feature 222 of vertical shaft holder 210 such that spring 212 may be compressed/decompressed to provide a vertical frictional torque during rotation of display bracket 224 relative to band torque engine 204.

Figure 2B:
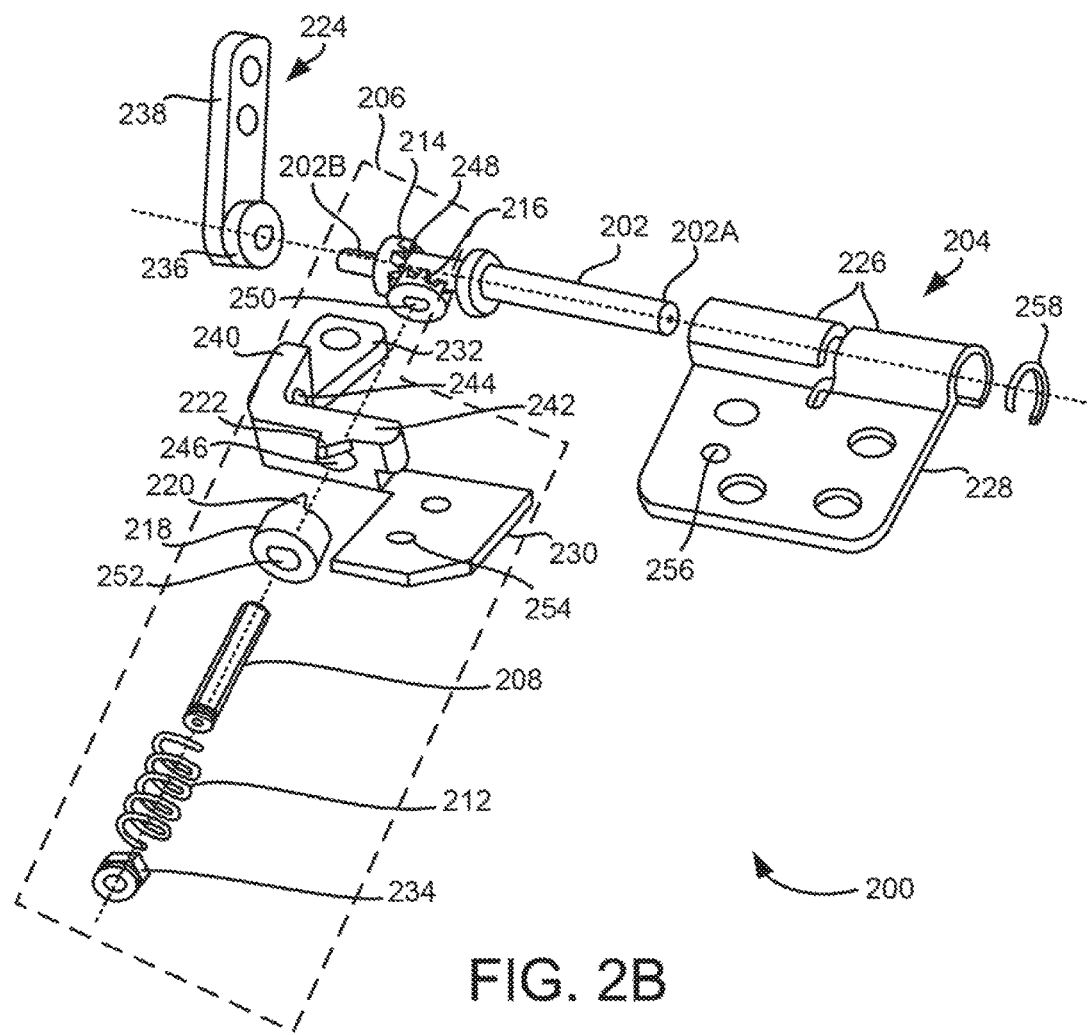
FIG. 2B is an exploded view of the example hinge assembly, depicting additional features of a vertical torque engine.

FIG. 2B is an exploded view of example hinge assembly 200, depicting additional features of vertical torque engine 206. As shown in FIG. 2B, band torque engine 204 may include at least one bearing portion 226 rotatably coupled to first end 202A of first shaft 202 and a flange portion 228 to fixedly engage with a base housing, for instance, using fasteners. Further, hinge assembly 200 may include end cap/end dip 258 attached at first end 202A of first shaft 202 to retain first shaft 202 within bearing portion 226.

Furthermore, display bracket 224 may include an adaptor portion 236 to hold second end 202B of first shaft 202 such that first shaft 202 rotates along with display bracket 224. For example, second end 202B of first shaft 202 may include at least one flat surface and is inserted into a similarly shaped bore within adaptor portion 236. Further, display bracket 224 may include a flange portion 238 to fixedly engage with a display housing such that first shaft 202 rotates along with the display housing.

Furthermore, vertical torque engine 206 may include a first coupling feature 230 to fixedly couple vertical torque engine 206 to band torque engine 204. For example, first coupling feature 230 may include slots 254 to securely engage with slots 256 of flange portion 228, for instance, using fasteners. vertical torque engine 206 may include a second coupling feature 232 to fixedly couple vertical torque engine 206 to a base housing, for instance, using fasteners.

In one example, vertical shaft holder 210 is a L-shaped structure having a first leg 240 and a second leg 242, for example, perpendicular to first leg 240. First leg 240 may have a first opening 244 to receive first shaft 202 and second leg 242 may have a second opening 246 to receive second shaft 208. As shown in FIG. 2B, protruding feature 222 of vertical shaft holder 210 is provided on second leg 242.

Further, first gear wheel 214 may be disposed adjacent to first leg 240 and include an opening 248 through which first shaft 202 is inserted such that first gear wheel 214 rotates along with first shaft 202. Second gear wheel 216 may be disposed adjacent to second leg 242 and in physical contact with first gear wheel 214 such that second gear wheel 216 rotates along with first gear wheel 214. In one example, second gear wheel 216 may include an opening 250 through which a first end of second shaft 208 is inserted such that second shaft 208 rotates along with second gear wheel 216.

For example, first shaft 202 and second shaft 208 may include at least one flat surface and is inserted into similarly shaped openings of respective ones of adaptor portion 236, first gear wheel 214, second gear wheel 216, and cam member 218. Further, display bracket 224, first leg 240, first gear wheel 214, and band torque engine 204 may be engaged with first shaft 202 along an axis of first shaft 202. Furthermore, second gear wheel 216, second leg 242, cam member 218, spring 212, and a fastener 234 may be engaged with second shaft 208 along an axis of second shaft 208.

Further, fastener 234 may be secured to a second end (i.e., opposite to the first end) of second shaft 208 such that spring 212 is compressively disposed between fastener 234 and cam member 218. Cam member 218 may be positioned for rotation along with second shaft 208 such that spring 212 may be compressed/decompressed. In one example, spring 212 mounted on second shaft 208 may gradually relax during opening of the display housing relative to the base housing as protruding feature 220 may slide along protruding feature 222, thereby providing the vertical frictional torque for the display housing. Relaxation of spring 212 may gradually change the frictional torque applied to first shaft 202, thereby holding the display housing in a stable and a stationary manner at multiple positions.

Figure 3:
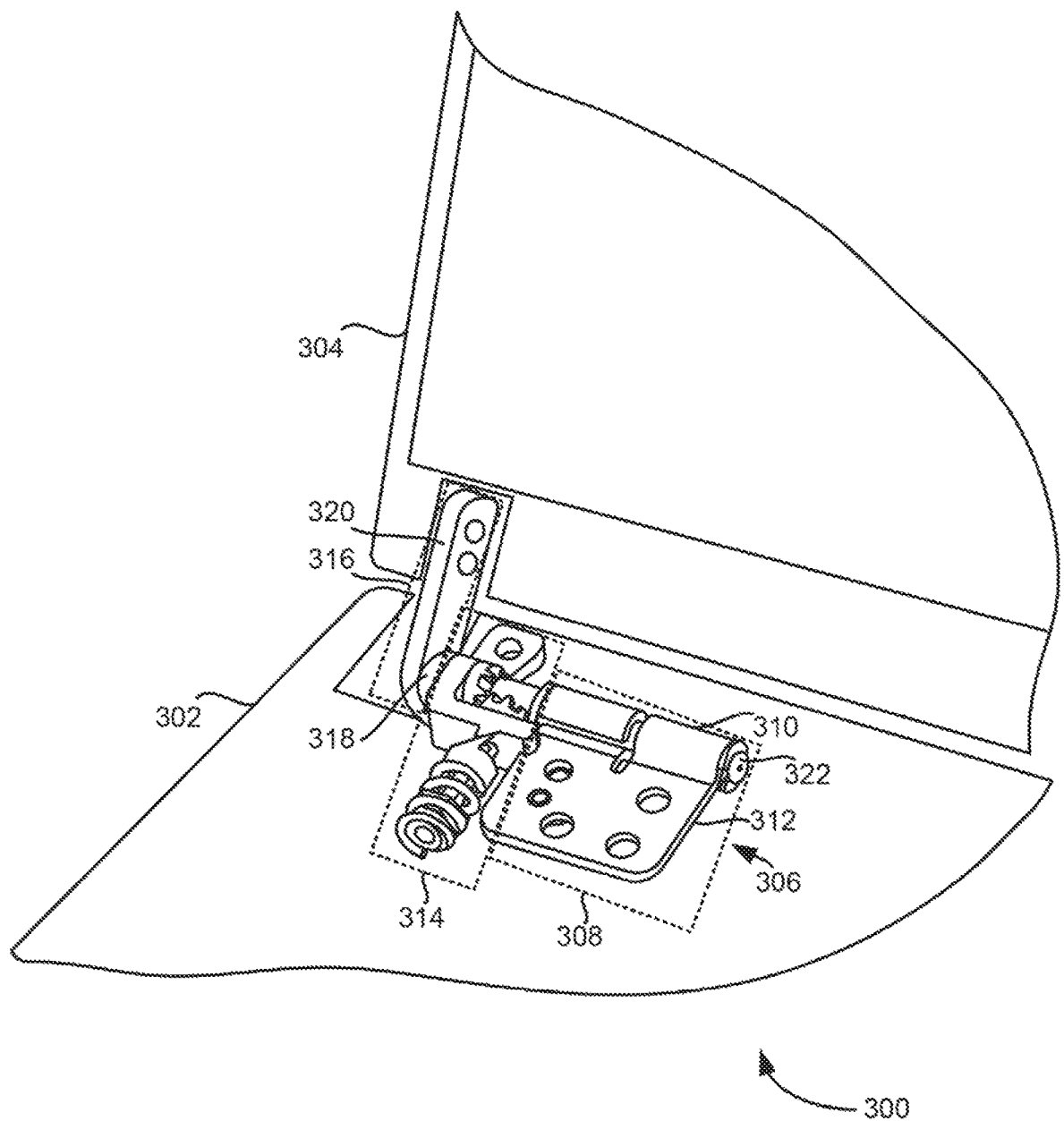
FIG. 3 is a perspective view of a portion of an example electronic device including an example hinge assembly to provide a vertical frictional torque.

FIG. 3 is a perspective view of a portion of an example electronic device 300 including an example hinge assembly 306 to provide a vertical frictional torque. Electronic device 300 may include a first housing 302 and a second housing 304 pivotally connected to first housing 302 via hinge assembly 306. Example electronic device 300 may be a computing system, for example, a laptop, a convertible device, a PDA, a notebook, a sub-notebook, a personal gaming device, or other computing device with second housing 304 closeable onto first housing 302. Example convertible device may refer to a device that can be "converted" from a laptop mode to a tablet mode. In the tablet mode, second housing 304 may be closed with a display facing up and viewable, i.e., second housing 304 may be substantially parallel to and adjacent to first housing 302.

For example, first housing 302 may house a keyboard, a battery, a touchpad, and so on. Second housing 304 may house a display (e.g., a touchscreen display). Example display may include liquid crystal display (LCD), light emitting diode (LED), electro-luminescent (EL) display, or the like. Electronic device 300 may be equipped with other components such as a camera, audio/video devices, and the like, depending on the functions of electronic device 300. Hinge assembly 306 may be pivotally connected to first housing 302 and second housing 304 along a pivot axis. Hinge assembly 306 may allow second housing 304 to rotate in directions about the pivot axis relative to first housing 302.

Example hinge assembly 306 may include a first shaft 322, a band torque engine 308, a vertical torque engine 314, and a display bracket 316. In one example, vertical torque engine 314 in combination with band torque engine 308 may provide multi-friction torque during rotation of second housing 304 relative to first housing 302. For example, multi-friction torque may be an overall torque generated by torque engines 308 and 314 to hold second housing 304 in a selected position.

As shown in FIG. 3, band torque engine 308 may include at least one bearing portion 310 rotatably coupled to first shaft 322 and a flange portion 312 fixedly engaged with first housing 302. Further, vertical torque engine 314 may be fixedly coupled to band torque engine 308 and may have an opening to rotatably engage with first shaft 322. Example components of vertical torque engine 314 are explained in detail in FIGS. 1A, 1B, 2A, and 2B.

Furthermore, display bracket 316 may include an adaptor portion 318 fixedly coupled to first shaft 322 and a flange portion 320 fixedly engaged with second housing 304. In one example, band torque engine 308 may provide a frictional torque and vertical torque engine 314 may be compressively engaged with first shaft 322 to provide the vertical frictional torque during rotation of second housing 304 relative to first housing 302.

Examples described herein can also be used in other hinge structures provided that the vertical frictional torque is generated/provided by a vertical torque engine in addition to the frictional torque provided by the band torque engine. For instance, vertical torque engine may provide the vertical frictional torque using a second shaft disposed perpendicular to the first shaft and a spring mounted to the second shaft such that the spring and the second shaft are to compressively engage with the first shaft.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A hinge assembly comprising:
   a band torque engine having at least one bearing portion;
   a vertical torque engine coupled to the band torque engine, the vertical torque engine having an opening;
   a first shaft received through the at least one bearing portion and the opening, wherein the first shaft is rotatable along an axis with respect to the band torque engine and the vertical torque engine; and
   a display bracket including an adaptor portion to hold the first shaft such that the first shaft rotates along with the display bracket, wherein the band torque engine provides a frictional torque and the vertical torque engine compressively engages with the first shaft to provide a vertical frictional torque during rotation of the display bracket;
   wherein the vertical torque engine comprises:
     a second shaft;
     a vertical shaft holder to hold the second shaft perpendicular to the first shaft, wherein the vertical shaft holder is coupled to the band torque engine and having the opening to receive the first shaft;
     a spring mounted on the second shaft; and
     a friction mechanism to compressively engage the vertical torque engine relative to the first shaft using the spring and the second shaft;
   wherein the friction mechanism comprises:
     first and second gear wheels fixedly coupled to the first shaft and the second shaft, respectively; and
     a cam member fixedly coupled to the second shaft with one side engaging with the spring and another side having a protruding feature engaging with a protruding feature of the vertical shaft holder, wherein the first and second gear wheels are to rotate the second shaft during rotation of the first shaft such that the spring provides the vertical frictional torque via the second shaft and the protruding features of the cam member and the vertical shaft holder.

2. The hinge assembly of claim 1, wherein the spring is in a compressed state when the display bracket is in a closed position relative to the band torque engine.

3. The hinge assembly of claim 1, wherein the display bracket comprises a display flange portion to fixedly engage the display bracket to a display housing.

4. The hinge assembly of claim 1, wherein the band torque engine comprises a base flange portion to fixedly engage the band torque engine to a base housing, and wherein the vertical torque engine comprises a coupling feature to fixedly engage the vertical torque engine to the base housing.

5. A hinge assembly comprising:
   a first shaft;
   a band torque engine rotatably coupled to a first end of the first shaft;
   a vertical torque engine comprising:
     a second shaft;
     a vertical shaft holder to hold the second shaft perpendicular to the first shaft, wherein the first shaft is rotatably coupled to the vertical shaft holder;
     a spring mounted on the second shaft;
     first and second gear wheels fixedly mounted to the first shaft and the second shaft, respectively, to rotate the second shaft during rotation of the first shaft; and a cam member fixedly mounted on the second shaft between the spring and the vertical shaft holder, the cam member having a protruding feature engaging with a protruding feature of the vertical shaft holder such that the spring provides a vertical frictional torque during rotation; and a display bracket to fixedly hold a second end of the first shaft.

6. The hinge assembly of claim 5, wherein the band torque engine comprises:

at least one bearing portion rotatably coupled to the first end of the first shaft; and a flange portion to fixedly engage with a base housing.

7. The hinge assembly of claim 5, wherein the vertical torque engine comprises:

a first coupling feature to fixedly couple the vertical torque engine to the band torque engine;

a second coupling feature to fixedly couple the vertical torque engine to a base housing; and a fastener secured to one end of the second shaft such that the spring is compressively disposed between the fastener and the cam member.

8. The hinge assembly of claim 5, wherein the display bracket comprises:

an adaptor portion to hold the second end of the first shaft such that the first shaft rotates along with the display bracket; and a flange portion to fixedly engage with a display housing such that the first shaft rotates along with the display housing.

9. The hinge assembly of claim 5, wherein the vertical shaft holder is a L-shaped structure having a first leg and a second leg, the first leg having a first opening to receive the first shaft and the second leg having a second opening to receive the second shaft, and wherein the protruding feature of the vertical shaft holder is provided on the second leg.

10. The hinge assembly of claim 9, wherein the first gear wheel is disposed adjacent to the first leg and includes an opening to fixedly engage with the first shaft such that the first gear wheel rotates along with the first shaft, wherein the second gear wheel is disposed adjacent to the second leg and in physical contact with the first gear wheel such that the second gear wheel rotates along with the first gear wheel, and wherein the second gear wheel includes an opening to fixedly engage with one end of the second shaft such that the second shaft rotates along with the second gear wheel.

11. An electronic device comprising:

a first housing;

a second housing; and a hinge assembly pivotally coupled to the first housing and the second housing along an axis, wherein the hinge assembly comprises:

a first shaft;

a band torque engine having at least one bearing portion rotatably coupled to the first shaft and a flange portion fixedly engaged with the first housing;

a vertical torque engine fixedly coupled to the band torque engine, the vertical torque engine having an opening to rotatably engage with the first shaft; and a display bracket including an adaptor portion fixedly coupled to the first shaft and a flange portion fixedly engaged with the second housing, wherein the band torque engine provides a frictional torque and the vertical torque engine compressively engages with the first shaft to provide a vertical frictional torque during rotation of the second housing relative to the first housing;

wherein the vertical torque engine comprises:

a second shaft disposed perpendicular to the first shaft;

a spring mounted to the second shaft such that the spring and the second shaft are to compressively engage with the first shaft to provide the vertical frictional torque;

a vertical shaft holder having a first opening to rotatably receive the first shaft and a second opening to rotatably receive the second shaft perpendicular to the first shaft;

the spring mounted on the second shaft;

first and second gear wheels fixedly coupled to the first shaft and the second shaft, respectively, to rotate the second shaft during rotation of the first shaft; and a cam member fixedly coupled to the second shaft between the spring and the vertical shaft holder, the cam member having a protruding feature engaging with a protruding feature of the vertical shaft holder, wherein the spring, the second shaft, and the cam member are to provide the vertical frictional torque during the rotation.

* * * * *